United States Patent [19]

Reese

[11] 4,103,660

[45] Aug. 1, 1978

[54] PULL-ROPE RECOIL STARTER

[75] Inventor: Paul T. Reese, New Holstein, Wis.

[73] Assignee: Tecumseh Products Company, Tecumseh, Mich.

[21] Appl. No.: 757,032

[22] Filed: Jan. 5, 1977

Related U.S. Application Data

[62] Division of Ser. No. 576,199, May 9, 1975, Pat. No. 4,019,490.

[51] Int. Cl.[2] .............................................. B60K 41/04
[52] U.S. Cl. ................................. 123/179 K; 74/850
[58] Field of Search ........... 123/185 R, 185 A, 185 B, 123/179 K; 74/6, 850

[56] References Cited

U.S. PATENT DOCUMENTS

| | | | |
|---|---|---|---|
| 1,168,915 | 1/1916 | Stocking | 127/185 BA |
| 2,938,511 | 5/1960 | Pike et al. | 127/185 BA |
| 3,024,780 | 3/1962 | Hamman | 123/185 BA |
| 3,449,964 | 6/1964 | Meyer | 123/185 A |
| 3,465,740 | 9/1969 | Harkness et al. | 123/185 R |
| 3,739,763 | 6/1973 | Berry et al. | 123/185 BA |
| 3,782,350 | 1/1974 | McBride | 123/179 K |
| 3,827,307 | 8/1974 | Couchman, Jr. | 123/185 BA |
| 3,906,921 | 9/1975 | Tillotson et al. | 74/850 |
| 3,942,505 | 3/1976 | Tillotson | 74/850 |

*Primary Examiner*—Charles J. Myhre
*Assistant Examiner*—David D. Reynolds
*Attorney, Agent, or Firm*—Albert L. Jeffers

[57] ABSTRACT

A side-mounted pull-rope recoil starter for low horsepower, vertical crankshaft internal combustion engines in which a starter gear moves vertically in a pair of journalled slots in the starter mounting bracket into engagement with a ring gear carried by the engine flywheel. The starter includes a starter brake spring which is released when the starter gear engages the flywheel, an operator handle which is specifically contoured to be comfortably held by the operator during pulling of the starter rope and a mechanical interlock between the engine and a drive transmission to prevent engagement of the starter mechanism when the transmission is in other than the neutral position. A safety lock mechanism which is operable by means of a removable key and which prevents unauthorized activation of the starter mechanism is also disclosed. A top-mounted pull-rope recoil starter is disclosed which incorporates many features of the basic side-mounted starter embodiment.

5 Claims, 22 Drawing Figures

PULL-ROPE RECOIL STARTER

This is a division of application Ser. No. 576,199, filed May 9, 1975 now U.S. Pat. No. 4,019,490.

The present invention relates to starter mechanisms for internal combustion engines and, more particularly, to hand-operated pull-rope recoil starters, specifically of the side-mounted and top-mounted types, for use with low horsepower, vertical crankshaft internal combustion engines.

Market demand for small, low horsepower internal combustion engines has increased significantly in recent years due to the widespread use of such engines on lawnmowers, garden tractors, tillers and the like. Vertical crankshaft engines are particularly popular in connection with rotary-type lawnmowers. Among the several different types of starter mechanisms available for such engines, the recoil starter has proven to be both economical to manufacture and reliable in operation, and for this reason remains one of the most popular types of starter mechanisms for home or recreational use. In a typical recoil starter, a starter pull-rope is wound about a spring-loaded pulley and terminates in an operator handle. When an operator pulls on the rope, a starter gear engages and rotates a ring gear operatively attached to the engine crankshaft, thereby "cranking" the engine to cause it to start and run under its own power. When the rope is released, a recoil spring automatically rewinds the rope onto the starter pulley.

Side-mounted starters, i.e., starters mounted on the side as opposed to the top of the engine, have gained particularly wide acceptance on rotary mowers because such starters are inherently oriented in a manner that facilitates pulling motion on the starter rope. More specifically, in rope-wound starters of this type the starter rope is usually disposed to be pulled in the vertical direction by a starter operator. Such vertical pulling action tends to be easier and more comfortable for the starter operator than does a horizontal pulling action, for example. Furthermore, the side-mounted starter conventionally drives the engine through a reduction gear ratio which additionally reduces the pulling effort required to crank an engine. These vertical pulling action and gear reduction factors combine to yield a class of starters which requires a minimum of operation effort to crank and start the engine. However, this seeming advantage may have disadvantageous side effects when the required cranking effort is so low that children may have the physical strength to start the engine even though they may be too young to be capable of operating the equipment to which the engine is mounted.

It is an object of the present invention to provide a recoil starter for low horsepower internal combustion engines which is both easy and economical to manufacture and install, and which is reliable in operation over the expected life time of the engine.

It is a related object of the present invention to provide a recoil starter of the side-mounted type which may be manufactured as a subassembly and then mounted as an integral unit onto the engine block of a small internal combustion engine.

It is another object of the present invention to provide a recoil starter in which a brake spring inhibits rotation of the starter mechanism until the mechanism is operatively engaged with the engine crankshaft, and in which the braking action of the brake spring is relieved upon such engagement so that the full pulling force provided by the operator is applied in the engine crankshaft.

It is yet another object of the present invention to provide a safety lock mechanism operable by means of a removable key for use with an engine recoil starter which prevents engagement of the starter mechanism with the engine flywheel to prevent unauthorized starting of the engine, as by children for example.

It is a further object of the present invention to provide a recoil starter for small internal combustion engines which includes a safety interlock operatively connected to the transmission of the engine-driven propulsion system of a mobile appliance or vehicle on which the engine is mounted, and which prevents engagement of the starter mechanism with the engine crankshaft when the transmission is in a position other than neutral. More particularly, it is an object of the present invention to provide a transmission/starter interlock which includes a Bowden cable operatively connecting the starter to the operator transmission control, and which further includes a retaining spring which reliably affixes the Bowden cable to the starter without the use of a mounting screw.

It is an object of the present invention to provide a handle for pull-rope recoil starters which is specifically designed to be comfortably held in the hand of a starter operator, and yet is economical to manufacture.

It is another object of the present invention to provide a recoil starter for low horsepower internal combustion engines in which the reaction force of the starter recoil spring is utilized in a way which causes the starter mechanism to automatically disengage the engine flywheel when the engine has started and to retain the starter in said disengaged position thereafter.

It is a further object of the present invention to provide a pull-rope recoil starter for low horsepower internal combustion engines which is compatible with conventional electric starter mechanisms.

It is yet another object of the present invention to provide a top-mounted recoil pull-rope starter in which a reduction starter gear ratio reduces the manual effort required to crank the engine.

In accordance with the present invention, a recoil starter particularly suitable for low horsepower, vertical crankshaft internal combustion engines is provided which includes some or all of the following structural features. A starter rope is wound about a pulley which is integrally molded with a starter gear and a shaft extending axially from each side of the pulley-gear piece. A brake spring loop is coiled about a pulley hub and has one leg which engages a corresponding rib on the starter mounting bracket to retard rotation of the starter mechanism, including the pulley, gear and shaft, when an operator initially pulls on the starter rope, thereby allowing such initial pulling action to bodily move the mechanism in a pair of slots in the mounting bracket into engagement with a ring gear carried by the engine flywheel. A second leg of the brake spring loop engages a corresponding rib on the mounting bracket and releases the brake as the starter gear engages the flywheel so that further pulling action on the rope causes corotation of the starter gear and crankshaft, thereby cranking the engine.

A recoil spring is coupled at one end to thè pulley hub and at the other end to frame ground near the horizontal centerline of the pulley and at a radius from the pulley center approximately equal to the outer convolution of the starter rope when the rope is wound onto the pulley and acting essentially collinearly with but in a direction opposite to the force applied by the starter operator via the rope. The spring not only acts to recoil the starter rope after the same has been released by the operator, but also pulls the starter mechanism out of engagement with the engine ring gear when tension on the starter rope is relaxed.

A T-shaped handle having wings which are ∇-shaped in axial cross section is attached to the starter rope by means of a conventional industrial staple. The rope is similarly attached to the pulley by means of a staple and is made extra long, as on the order of five feet. A mechanical interlock, including a Bowden cable, is coupled to a transmission associated with the engine and prevents engagement of the starter with the engine ring gear when the transmission is in a position other than neutral.

The novel features which are considered to be characteristic of the present invention are set forth in particular in the appended claims. The invention itself, however, together with additional objects, features and advantages thereof will be best understood from the following description when read in conjunction with the accompanying drawings in which:

Figure 14:
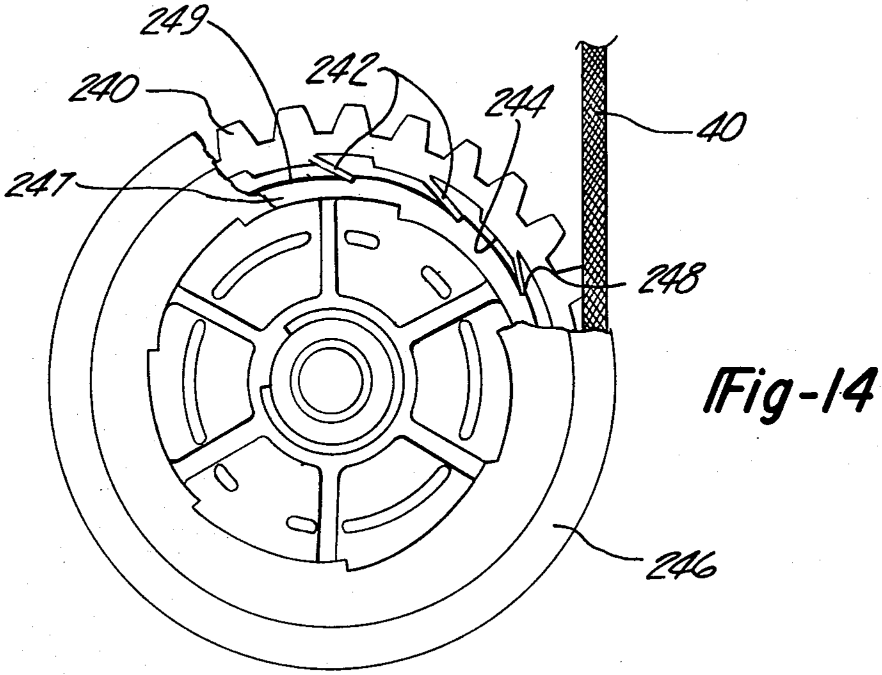
Figure 2:
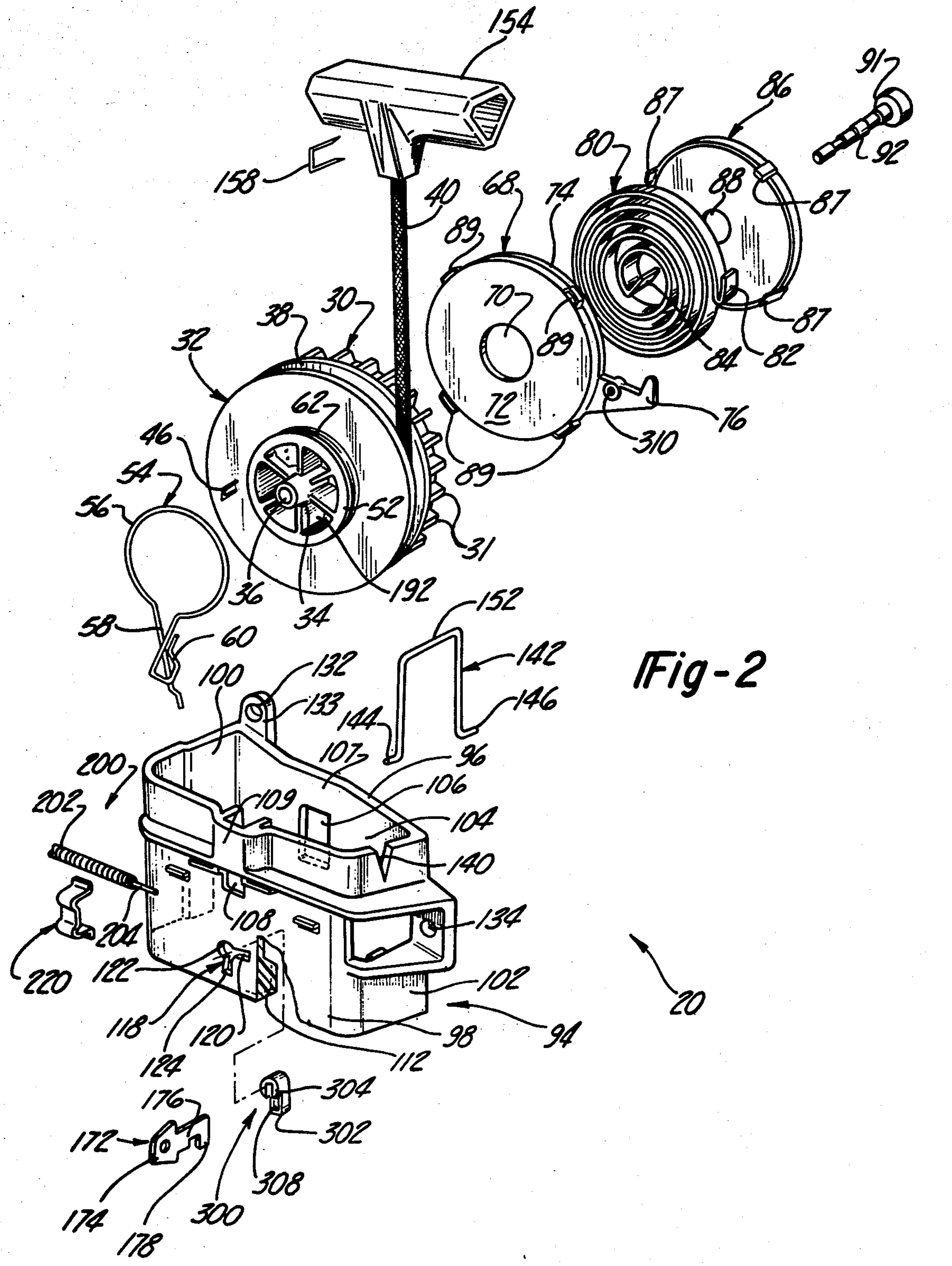
FIG. 2 is an exploded view of the side-mounted starter shown in FIG. 1.
Figure 3:
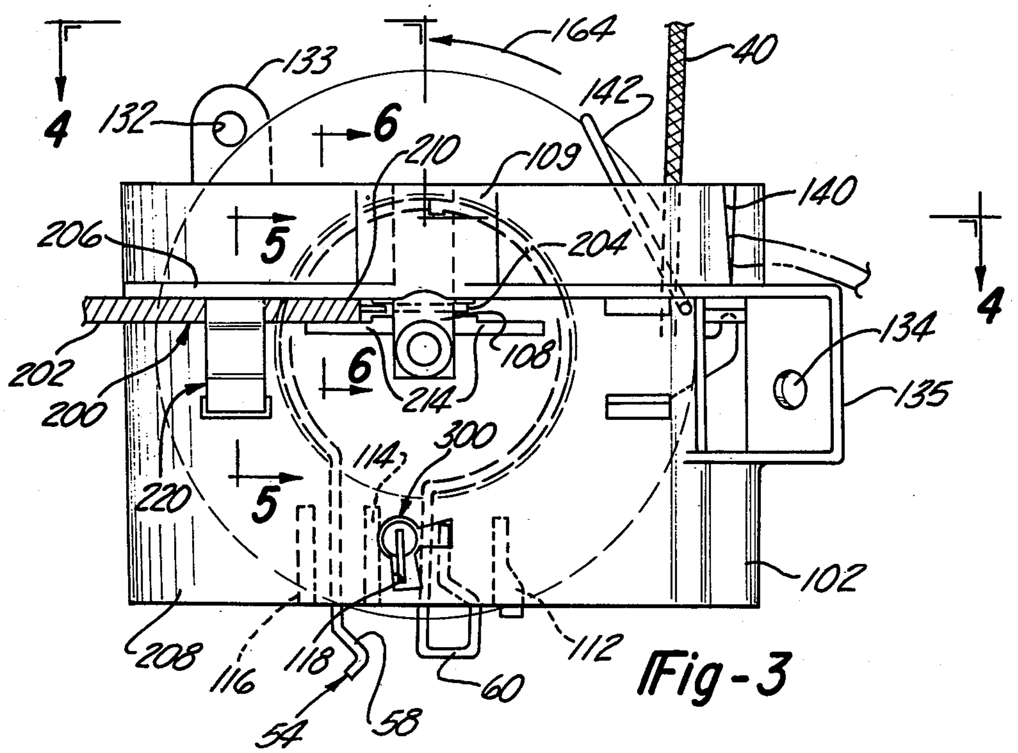
FIG. 3 is a front elevational view of the starter shown in FIG. 1 detached from the engine assembly.
Figure 4:
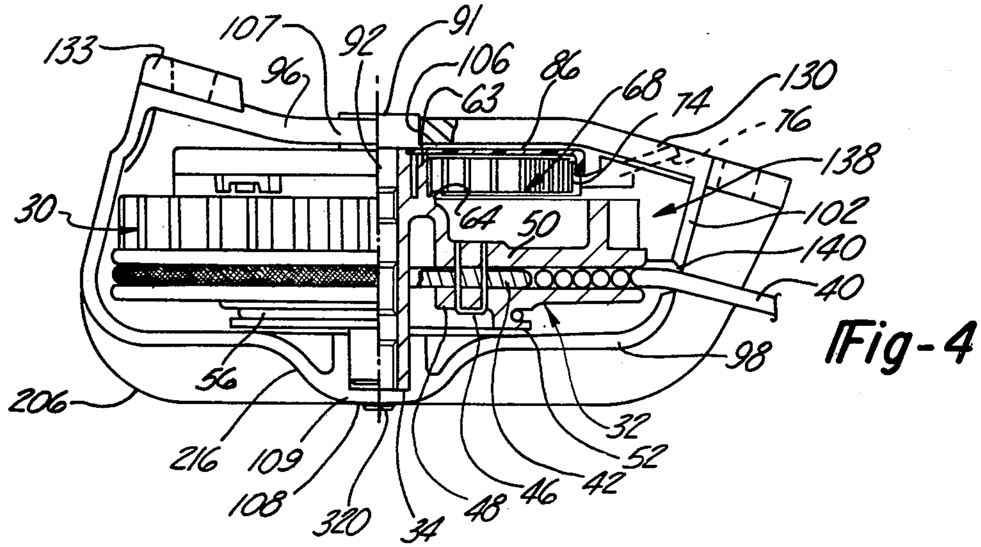
FIG. 4 is a plan view, partially in section, of the starter shown in FIG. 3 and is taken along the line 4—4 of FIG. 3.
Figure 5:
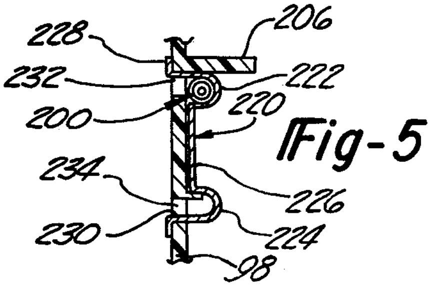
Figure 6:
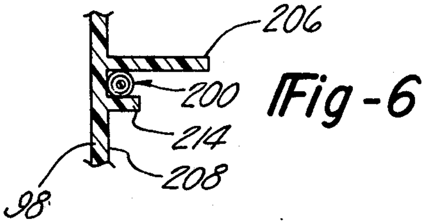
Figure 7:
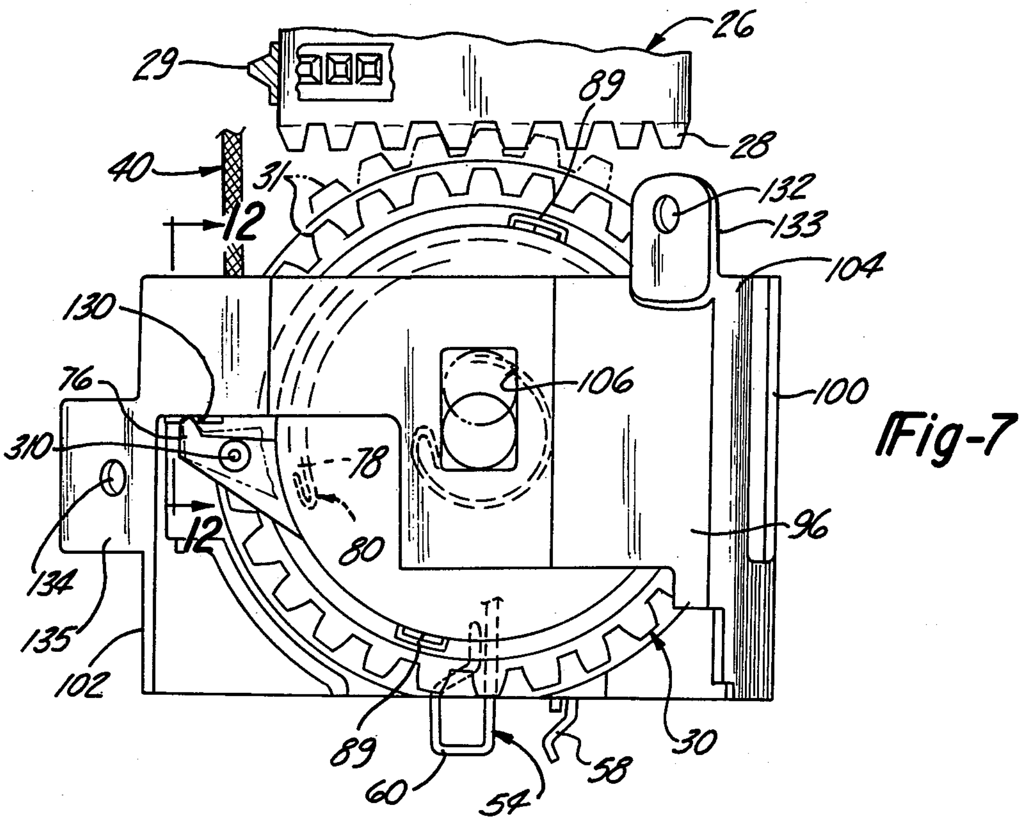
Figure 12:
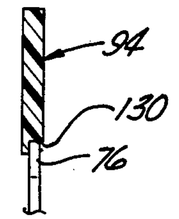
Figure 13:
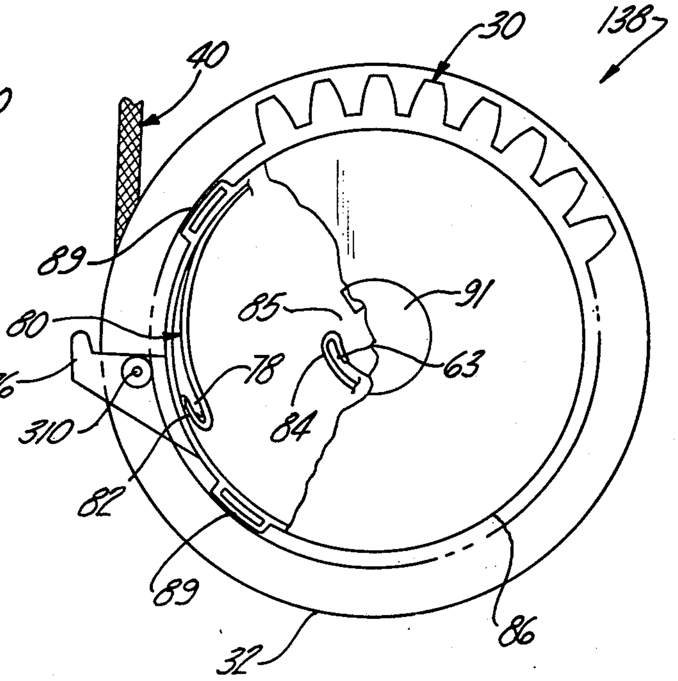
Figure 8:
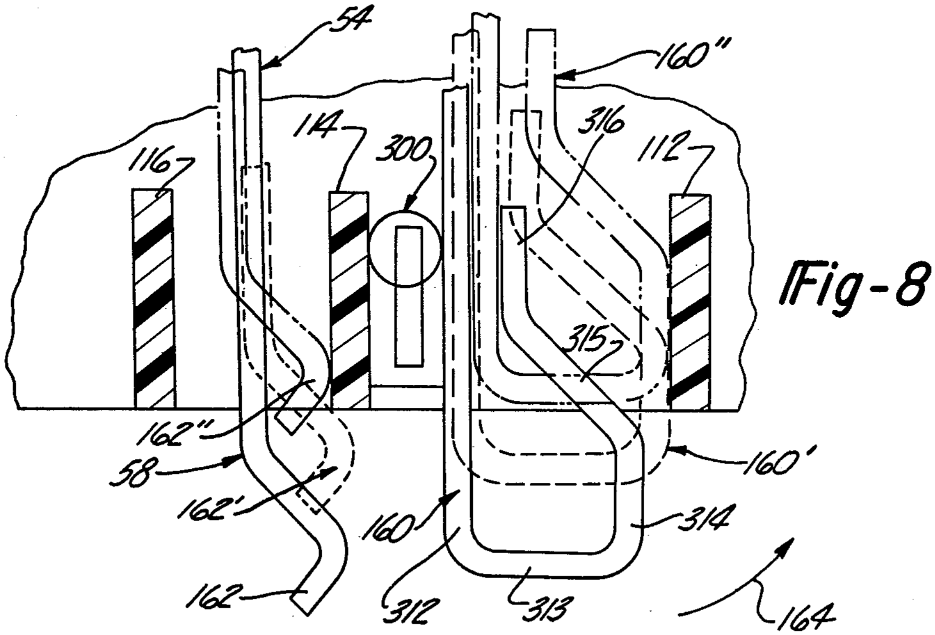
Figure 9:
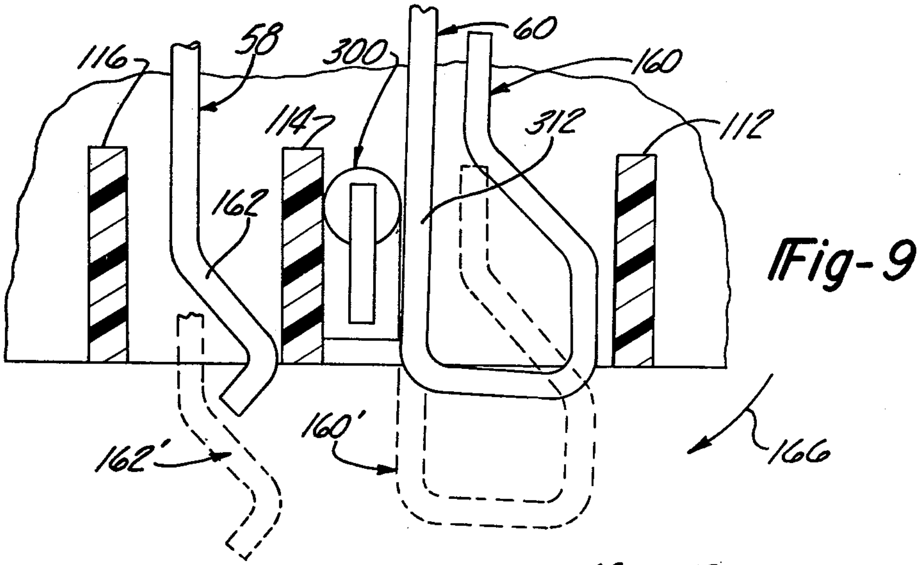
Figure 10:
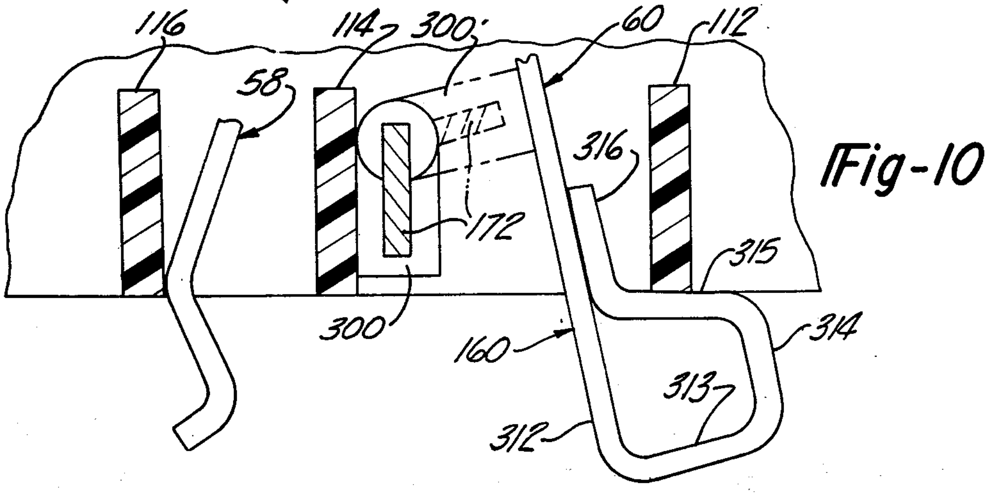
Figure 11:
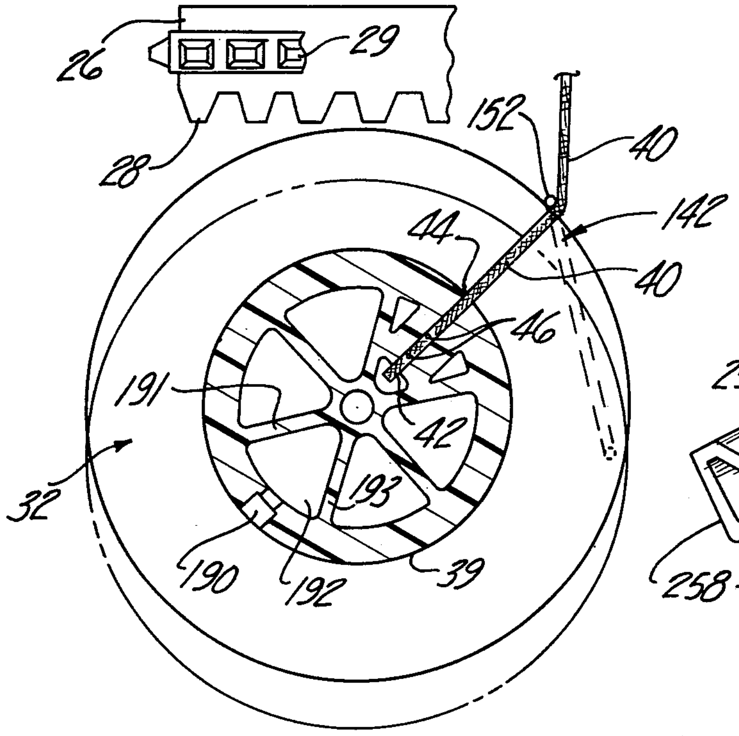
Figure 15:
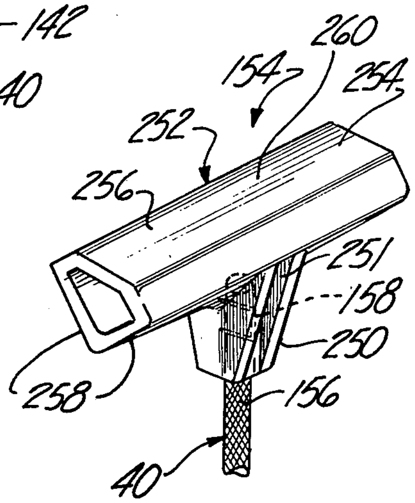
Figure 16:
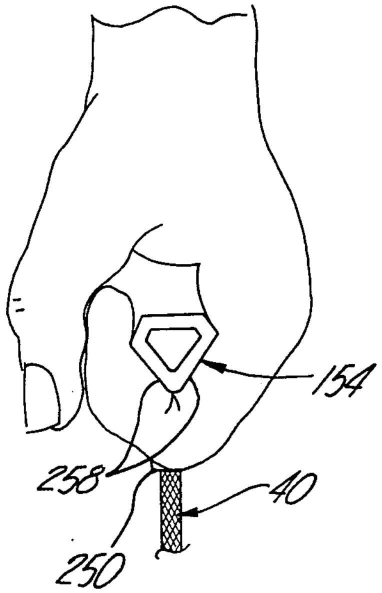
Figure 17:
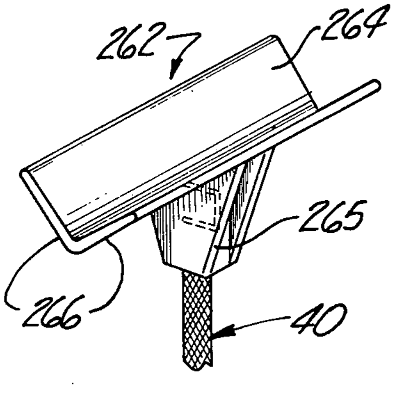
Figure 18:
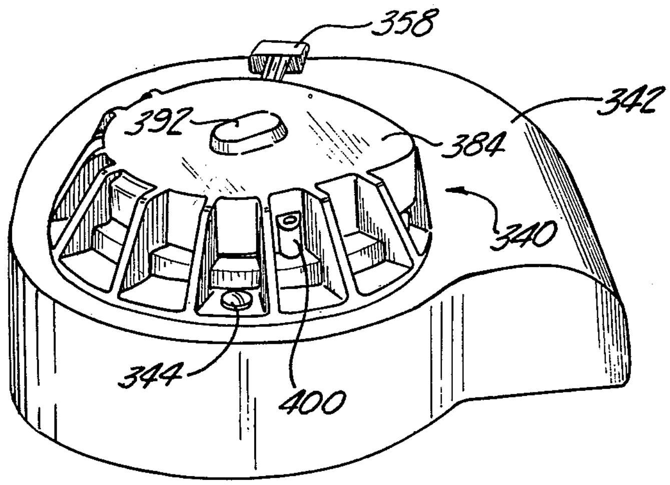
Figure 20:
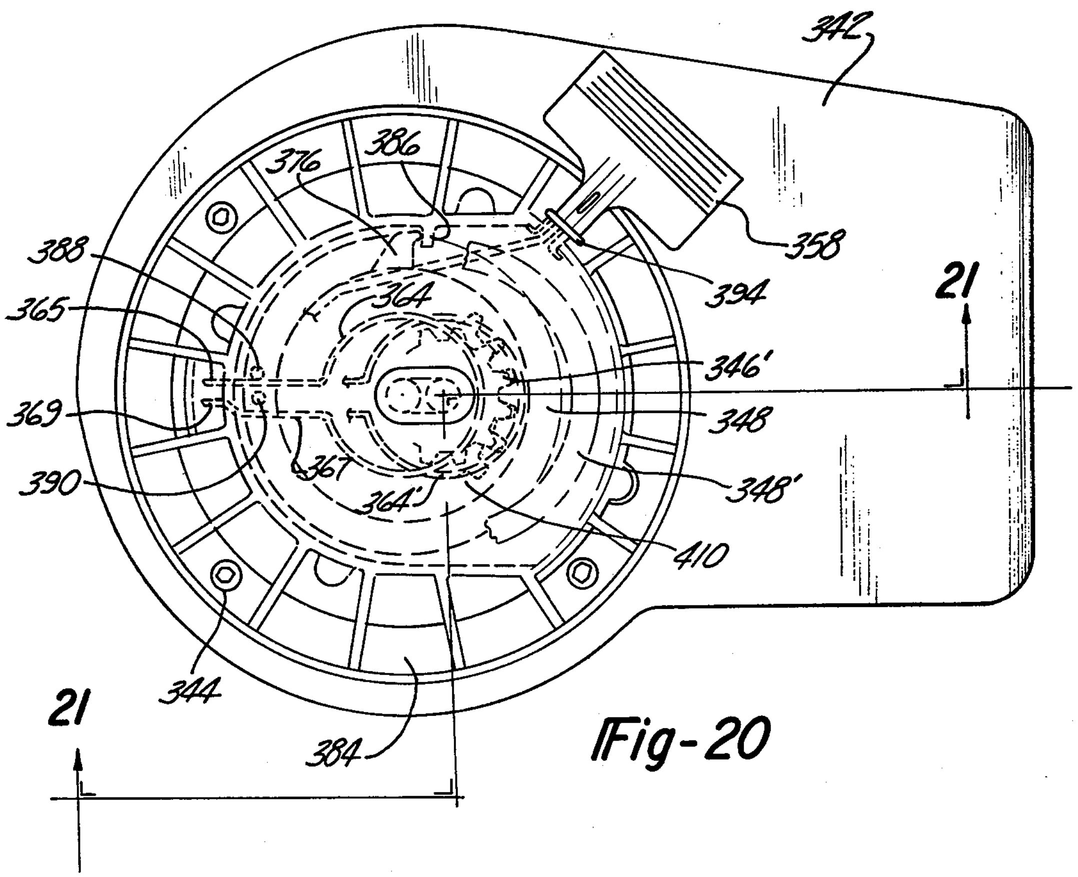
Figure 22:
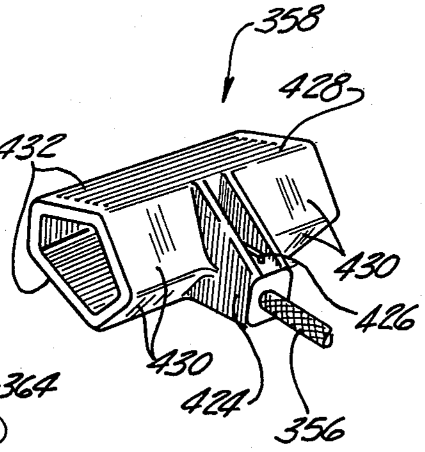
Figure 19:
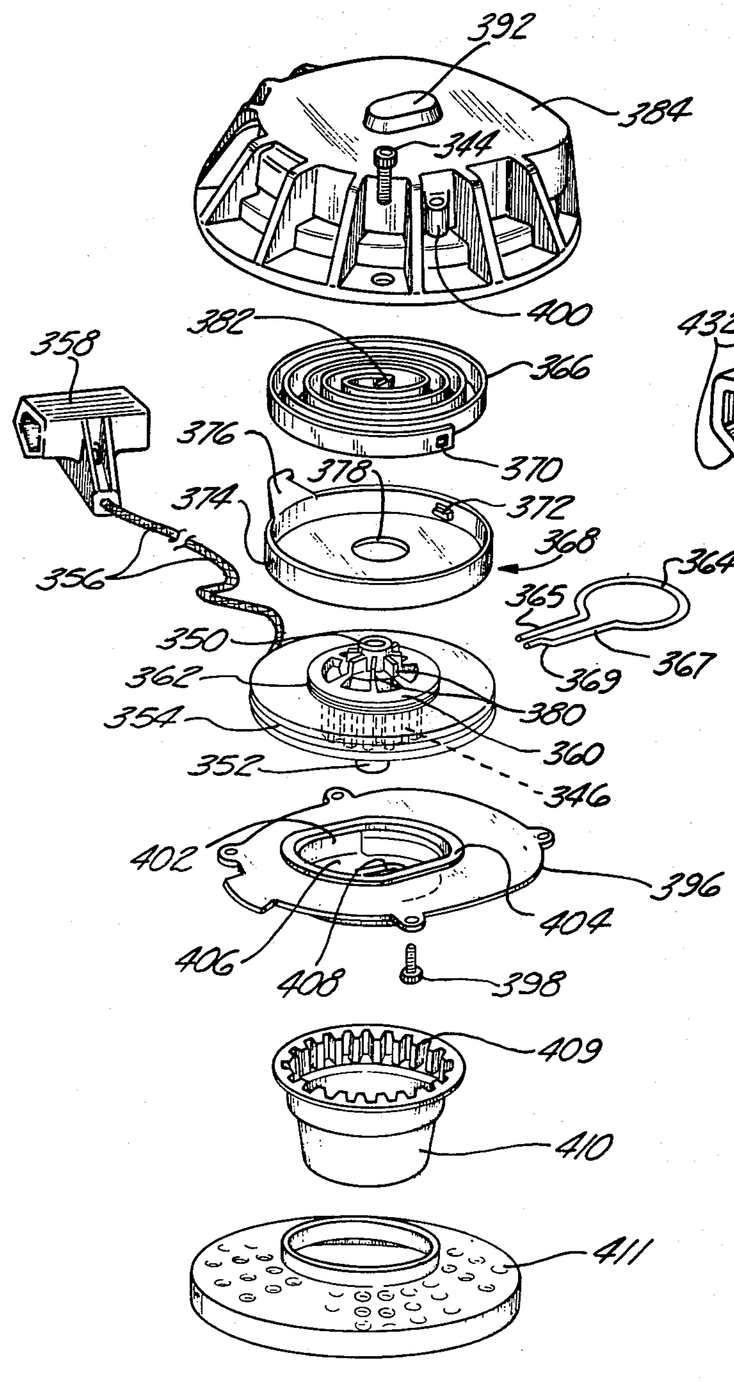
Figure 21:
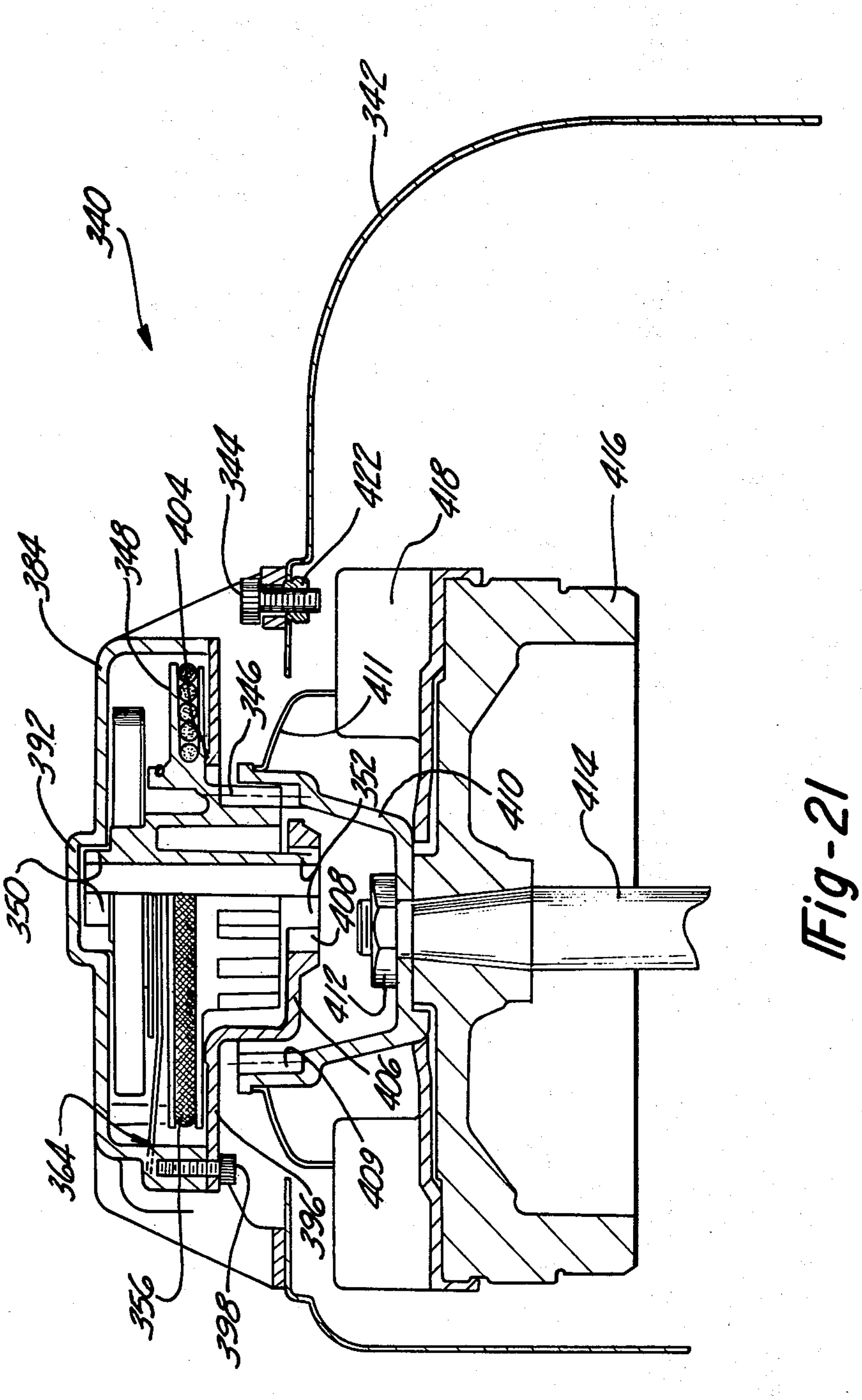

FIGS. 5 and 6 are sectional views respectively taken along the lines 5—5 and 6—6 of FIG. 3;

FIG. 7 is a rear elevational view of the starter shown in FIGS. 1-4 in which the rest position of the starter mechanism is indicated in solid lines and the engaged position of the starter mechanism is partially indicated in phantom lines;

FIGS. 8 and 9 are sectional views depicting successive positions of the brake spring legs during engagement and disengagement of the starter mechanism respectively;

FIG. 10 is a sectional view similar to FIGS. 8 and 9 depicting the motion of the spring legs during safety locking of the starter, and the position of the spring legs when the starter is locked;

FIG. 11 is a sectional view of the starter pulley depicting the condition of the pulley when the starter rope has been fully extended;

FIG. 12 is a sectional view taken along the line 12—12 of FIG. 7;

FIG. 13 is a rear elevational view, partially in section, of the starter mechanism;

FIG. 14 is an elevational view, partially in section, of an alternative embodiment of the starter gear and pulley shown in FIGS. 2-4;

FIG. 15 is a perspective view of a presently preferred embodiment of the starter handle provided by the invention;

FIG. 16 depicts the handle shown in FIG. 15 being gripped by the hand of a starter operator;

FIG. 17 is a perspective view of an alternative embodiment of the handle provided by the invention;

FIG. 18 is a perspective view showing a presently preferred embodiment of the top-mounted starter provided by the present invention mounted to an engine blower housing;

FIG. 19 is an exploded view of the top-mounted starter shown in FIG. 18;

FIG. 20 is a plan view of the starter shown in FIG. 18 with selected components of the starter mechanism shown in phantom in the rest and engaged positions;

FIG. 21 is a front elevational view, partially in section, of the starter shown in FIG. 20 and is taken along the line 21—21 of FIG. 20; and FIG. 22 is a perspective view of another embodiment of the handle provided by the present invention.

Figure 1:
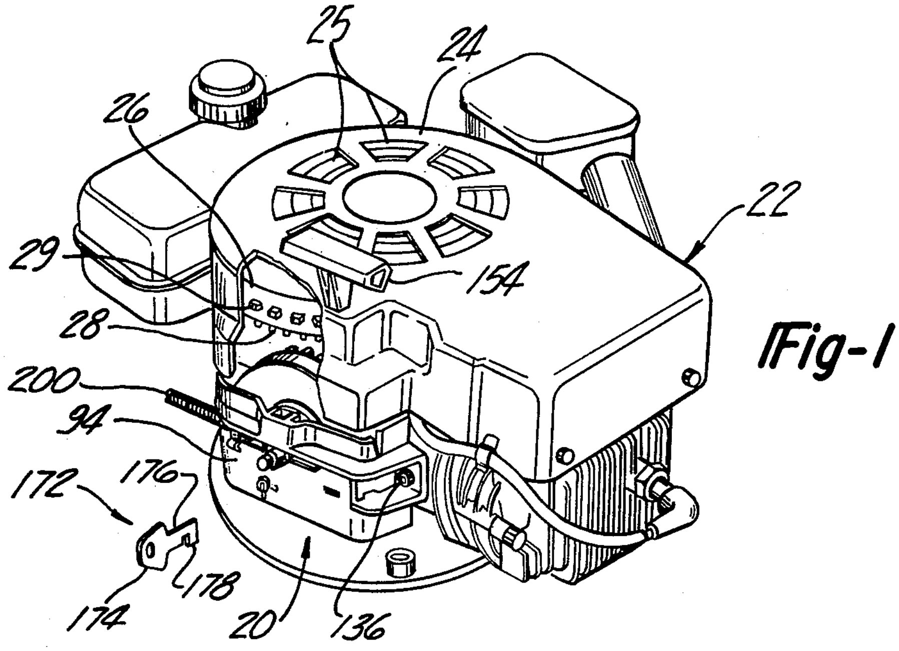
FIG. 1 is a perspective view of a low horsepower, vertical crankshaft internal combustion engine upon the side of which is mounted a presently preferred embodiment of the starter provided in accordance with the present invention.

Referring to FIG. 1, a presently preferred embodiment 20 of the recoil starter provided by the present invention is shown mounted to the side of a vertical crankshaft internal combustion engine 22. Engine 22 has a blower housing or cowling 24 which is formed of sheet steel with an integral guard screen 25, and which is partially broken away in the drawing in FIG. 1 to expose an inertia flywheel 26 fixedly connected to the vertical crankshaft (not shown) of the engine. A ring gear 28 is either cast integrally with flywheel 26, as of cast iron for example, or is fabricated separately of the flywheel and pressed thereon in a separate assembly operation. A second ring gear 29 is disposed about the periphery of flywheel 26 and, like gear 28, may be either integrally cast with or pressed onto the flywheel. Gear 29 is usually provided only where it is anticipated that an electric starter (not shown) may be later installed onto engine 22, as by the engine retailer or by the ultimate consumer. Generally speaking, starter 20 includes a starter gear which engages ring gear 28 and rotates the ring gear, flywheel and crankshaft, thereby "cranking" and starting the engine.

The details of starter 20 will be best understood with initial reference to FIGS. 2-4, 7 and 11-13. A starter gear 30 is integrally molded with a pulley or sheave 32, preferably of a nylon material, and has an integral shaft extending axially therefrom at 34. Shaft 34 is hollow having a bore 36 extending axially therethrough. Gear 30 has a series of gear teeth 31 spaced about the periphery thereof to engage ring gear 28 (FIGS. 1 and 7). Pulley 32 has a rope-receiving groove 38 about the periphery thereof which terminates radially inwardly in a groove root 39 (FIG. 11) about which a 65 inch nylon starter rope 40 is spirally wound upon itself. Starter rope 40 is fed at its inner end 42 (FIGS. 4 and 11) into a hole 44 extending radially inwardly of groove root 39 and is affixed to pulley 32 by means of a double pronged, U-shaped industrial staple 46. As best seen in FIGS. 4 and 11, staple 46 preferably has both prongs driven through a first wall 48 of pulley 32, through rope end 42, and then into a second wall 50 of the pulley. Preferably, about 0.312 to 0.375 inches of rope extend inwardly of staple 46, and the tip of the rope is preferably cauterized to combine the individual fibers thereof into a common amorphous mass and to thereby prevent fraying or splitting of the starter rope when the rope is pulled.

A cylindrical hub 52 integral with pulley 32 extends axially outwardly therefrom, i.e., away from the engine block as seen in FIG. 1. A brake spring 54 having an open brake loop 56 and a pair of legs 58,60 is received by snap-fit in a groove 62 about the circumference of hub 52. As will be discussed in detail later in connection with FIGS. 8–10, spring leg 58 is formed in the shape of a V-neck while the neck of leg 60 is generally hairpin-shaped.

As best seen in FIG. 4, a second cylindrical hub 63 extends axially inwardly of gear 30 intergrally therewith. A cup-shaped housing 68 molded of a plastic material such as nylon has a central hole 70 in the base 72 thereof which is received over hub 63, and has an axially extending cup or housing wall 74. A hook-shaped strut or finger 76 extends first radially and then circumferentially from base 72. On the inside of the cup, as best seen in FIG. 8, a second hook-shaped notch or finger 78 extends radially inwardly and then circumferentially from wall 74, hooks 76 and 78 being aligned radially of housing 68. A recoil spring 80 spirally wound edgewise of flat ribbon spring-stock is mounted within housing 68, an outer end 82 of spring 80 being hooked to fit into notch 78 of housing 68. The inner end 84 of spring 80 is bent over and received in a corresponding axially extending notch 85 in hub 63 as indicated in FIG. 8. A molded plastic cover 86 is fitted onto housing 68 over wall 74, and a series of four L-shaped locking tabs 87 disposed about the circumference of cover 86 enter and engage mating retainers 89 similarly disposed about the circumference of wall 74 to firmly lock cover 86 to housing 68. A central hole 88 in cover 86 is received over shaft 34. A headed retaining pin 90 is pressed into bore 36 to hold the housing assembly comprising housing 68, spring 80 and cover 86 firmly in place, and to serve as an extension of center shaft 34 beyond cover 86 as best seen in FIG. 4. The head 91 of pin 90 thereby serves as the inner terminus of shaft 34.

A starter bracket 94 of molded plastic has axial inner and outer walls 96,98 and radial walls 100,102 which together form a generally rectangular cavity 104 open at the top and bottom. Walls 96,98 each have an upwardly extending journalled slot 106, 108 respectively formed therein. Slots 106,108 are enclosed at their upper limits by the respective slot bridges 107,109, bridge 109 being displaced axially of bracket wall 98 as best seen in FIG. 4. The inner face of wall 98 has formed thereon three ribs 112,114, and 116 (FIGS. 3 and 8–10) which are used to control the braking action of spring 54 as will be discussed in detail hereinafter. A keyhole 118 is located in wall 98 between ribs 112 and 114. Keyhole 118 is formed by a generally circular aperture 122 with a first elongated trapezoidal slot 124 extending radially downwardly therefrom and a second similar trapezoidal slot 120 extending radially therefrom toward rib 112. The lower edge of inner wall 96 is displaced upwardly to form a thrust surface or shoulder 130 which supports the strut 76, as best seen in FIGS. 7 and 12. A pair of holes 132,134 are provided in bracket flanges 133,135 for mounting of the starter 20 to engine 22, as by mounting stud 136 (FIG. 1).

A locking pawl 300 is rotatably mounted to bracket 94 inwardly of wall 98 and comprises a generally rectangular flat pawl portion 302 having a thickness dimension which is slightly less than the distance between the inner surface of wall 98 and the outer surface of pulley 32, i.e., approximately equal to the axial dimension of hub 52 which spaces pulley 32 from wall 98. A cylindrical boss 304 projects from pawl portion 302 into aperture 122. Thus, pawl 300 is loosely retained in starter 20 by the close inter-surface relationship between pulley 32, pawl portion 302 and wall 98, and by projection of boss 304 into aperture 122. Locking pawl 300 is hollowed by an elongated keyhole or through-slot 308. Thus, as locking pawl 300 is rotated about the axis of boss 304 (and aperture 122), slot 308 selectively registers with slots 124,120 in the unlocked and locked positions respectively. Operation of the starter locking feature will be discussed in detail hereinafter in connection with FIG. 10.

The structure of starter 20 thus far described in connection with the drawings may be separately assembled and then installed onto an engine as shown in FIG. 1. Starter rope 40 is first attached to pulley 32 by staple 46 and then wound about the pulley in groove 38. Recoil spring 80 is inserted into housing 68 with spring end 82 engaged with notch 78. The housing assembly is then fitted over hub 63 with inner spring end 84 being received in notch 85 of the hub, and cover 86 is snap-fitted over housing wall 74, respective locking tabs 87 being received in corresponding retainers 89 as described above. The housing assembly is pressed against a shoulder 64 on hub 63 until the inner surface of cover 86 is against the end of hub 63 as shown in FIG. 4. To retain the housing assembly on the hub, pin 92 is then press-fitted into bore 36 until head 91 contacts the axially inner end of shaft 34. Dust is now prevented from entering the housing assembly by sealing contact between cover 86 and head 91, and shoulder 64 and housing 68. Brake spring 54 is then snapped into groove 62 to form the moving portion or mechanism of starter 20 which is generally indicated at 138 of FIG. 4.

Before inserting starter mechanism 138 into bracket 94, pulley 32 is first "prewound" with respect to spring 80 and housing 68 by rotating the pulley four or five turns with respect to the housing in a direction causing spring 80 to contract, i.e., counterclockwise as viewed in FIG. 2. A temporary retaining pin is then inserted through the hole 310 in strut 76 to engage an adjacent tooth on gear 30, and to thereby retain the spring in the prewound condition during insertion of starter mechanism 138 into bracket 94. (Axial alignment of hole 310 with the teeth of gear 30 is best seen in FIG. 7.) Locking pawl 300 is now loosely mounted to bracket wall 98 by fitting pawl boss 304 into aperture 122. Brake spring legs 58,60 are then respectively aligned between rib pairs 114,116 and 112,114. Starter mechanism 138 may then be fitted into bracket 94 with shaft 34 being slidably received into slot 106. Pin 92 is then pressed into bore 36. The temporary pin in hole 310 may then be removed allowing housing finger 76 to move into abutment with shoulder 130 as shown in FIGS. 7 and 12. A V-shaped groove 140 is provided in wall 102 for pinch-fit insertion of rope 40 as shown in FIG. 4. With the rope thus held, the starter mechanism may now be released without unwinding prestressed spring 80. Thus, under normal or rest conditions, the starter mounting bracket supports the starter mechanism as a simple beam with the support being at either end of the beam (i.e., starter shaft and pin) and the load (i.e., the forces applied to the gear, pulley and recoil spring) at the beam center. This structure allows the use of a less expensive although somewhat weaker material, such as molded plastic, for the mounting bracket than does the conventional cantilevered shaft arrangement in which aluminum or steel brackets are usually provided.

A U-shaped retaining clip 142 (FIGS. 2, 3 and 11) having a pair of outwardly turned fingers 144,146 at the free ends of the U is inversely mounted to bracket 94 by snapping fingers 144,146 into the respective holes 148,150 provided in starter bracket walls 98,96. Clip 142 is disposed generally above the outer convolution of rope 40 with the rope fitted into groove 140 radially outwardly of the bight 152 of clip 142. At this stage of assembly, the starter is ready for mounting on the engine.

An operator handle 154 is affixed to the outer end 156 of rope 40 by means of a double pronged, U-shaped industrial staple 158 which is identical to staple 46. Handle 154 will be described in detail later in connection with FIGS. 15–16. Continuing the preferred assembly method outlined above handle 154, which may be economically molded of a plastic compound having a low melting temperature, is attached to rope end 156 only after the starter and engine have been painted and processed in a paint-drying oven. Rope 40 may be then removed from notch 140, fed upwardly through cowling 24 (FIG. 1), and then attached to the handle 154 as above-described.

Referring now to FIG. 8 wherein solid lines indicate the rest position of spring legs 58,60, spring leg 58 terminates, as depicted, in a V-neck 162 between bracket ribs 114,116 with the V generally pointing in the direction of rib 114 but spaced therefrom in a direction opposed to the direction of movement of starter mechanism 138 when the starter rope is pulled. Typically, the respective portions of V-neck 162 are angulated at about 45° with respect to the major radially extending portion of spring leg 58. Spring leg 60 terminates between locking pawl 300 and bracket rib 112 in a generally hairpin-shaped neck 160 having successively contiguous portions 312, 313, 314, 315 and 316, portion 315 being at an angle of about 45° with respect to leg 60 and portions 314,316 being parallel to leg 60. When starter rope 40 is initially pulled, the starter mechanism tends to rotate in the direction 164 of FIGS. 3 and 8, causing neck 160 to rotate and causing neck portion 314 to bear against rib 112. The starter mechanism, and particularly pulley hub 52 (FIG. 2), tends to rotate brake spring 54, but such rotation is resisted by leg 60 which is held in fixed angular position by rib 112. The brake spring thus tends to tighten about the pulley hub, thereby frictionally inhibiting rotation thereof. With rotation of the starter mechanism thus inhibited, the initial pulling action on starter rope 40 overcomes the yieldable force generated by spring 80 between strut 76 and shoulder 130, and "lifts" the starter mechanism so as to bodily move it toward ring gear 28 (FIGS. 1 and 7) in a linear upward direction parallel to the pulling force on the rope. At the same time spring legs 58,60 translate through positions successively indicated in phantom in FIG. 8 at 162',162", 160',160" respectively.

As the starter mechanism and brake spring bodily move vertically toward and, finally, into engagement with ring gear 28 (FIGS. 1 and 7), V-neck 162 of spring leg 58 contacts a corner of rib 114, as at 162' of FIG. 8. Continued vertical translation of the starter mechanism causes spring leg 58 to ride over the corner of rib 114 and then along the surface of the rib as shown at 162", thus tending to spread leg 58 with respect to leg 60 to thereby open spring loop 56 (FIG. 2). Brake pressure exerted by brake spring 54 upon pulley hub 52 is thus relieved, allowing free rotation of the entire starter mechanism. This free rotation holds leg 58 firmly against rib 114 and, to the extent that there is friction between hub 52 and loop 56, tends to further open the spring loop. Thus the braking force of brake spring 54 upon hub 62 is substantially completely relieved, and the full pulling force upon the starter rope is transferred to ring gear 28 and to the engine crankshaft.

The action of spring legs 58,60 upon release of the starter rope is figuratively depicted in FIG. 9. During the recoil operation, the starter pulley, and particularly pulley hub 52, rotates oppositely of direction 164 (FIG. 8), i.e., in direction 166 (FIG. 9). Spring leg 60 rotates into abutment with pawl 300 as indicated at neck 160 of FIG. 9. With leg 60 of the brake spring thus held, and with leg 58 remaining free between ribs 114,116 as shown at 162 of FIG. 9, braking action of spring 54 is minimized such that pulley 32 rotates freely to recoil rope 40.

As shown in FIG. 7, strut 76 serves as a retraction lever and attaches recoil spring 80 to "ground" at the outer end of the spring, i.e., finger 76 is slidably fulcrummed as a third class lever to the chassis of engine 22 via shoulder 130 of bracket 94 at or slightly below the rest centerline of pulley shaft 36 and at a radius approximately equal to the radius of the outer convolution of rope 40. When recoil spring 80 is prewound as indicated above, abutment of finger 76 against shoulder 130 exerts a force-couple upon the starter mechanism holding the mechanism against the bottom of slots 108,106. Further, when the starter rope is pulled thereby moving pulley 32 and gear 30 upwardly into engagement with ring gear 28, the action of finger 76 against shoulder 130 exerts a force-couple upon the centerline of shaft 34 tending to pull the starter mechanism back toward the bottom of the respective slots. As the rope is uncoiled from the pulley, the retraction force of rewind spring 80 increases and counteracts the increasing force on the pull-rope. When the rope is released, recoil spring 80 thus acts not only to rewind the starter rope upon pulley 32, but also pulls pulley 32 and starter gear 30 out of engagement with ring gear 28 and back down into the rest position at the bottom of slots 106,108. Thereafter, spring 80 is effective to maintain the starter 30 in the rest position despite vibrations, etc. caused by operation of the engine and regardless of the orientation of the starter. When the engine starts midway of a pull on the rope, the flywheel gear will drive the starter gear at a rotation rate slightly faster than that rate produced by the pulling effort. This overrun of the starter gear and integral pulley automatically plays out additional rope producing slack which deprives the rope of the vertical force component which maintains engagement. This allows the external couple of the rewind spring to pull the pulley and gear downwardly out of engagement with the flywheel gear.

It should also be noted with respect to FIG. 7 that, when the respective starter and ring gears 30,28 are in engagement (depicted in phantom) the teeth of the respective gears do not "bottom out" in the corresponding roots in the opposing gear. To accomplish this result, the structure hereinabove described serves to limit movement of starter mechanism 138 toward gear 28. More specifically, it will be noted with respect to FIG. 4 that, before pin 92 is pressed into shaft bore 36, shaft 34 is free to move radially in slot 108 while slot 106 is empty of any structure directly affixed to mechanism 138. However, when pin 92 is pressed into the position in bore 36 as indicated in FIG. 4, pin head 91 is captured within slot 106 by bridge 107, while the end 320 of pin 92 remote from head 91 extends axially outwardly of shaft 34 underneath bridge 109 of slot 108. Thus, upon engagement of gears 28,31, pin head 91 abuts bridge 107 and pin end 320 abuts bridge 109 to limit movement of mechanism 138 as described above. By thus limiting engagement between gears 28, 31, the annoying rattling or ratcheting sound caused by the respective gear teeth bottoming out in corresponding roots is eliminated.

Referring to FIG. 1, a key 172 stamped from a piece of flat metal stock having a handle 174 and a shank 176 with an actuator cam 178 extending tangentially therefrom is selectively insertable into keyhole 118 and locking pawl 300, both of which have already been described. As shown in FIG. 10, when key 172 is inserted through keyhole 118, or, more particularly, through aperture 122 and slot 124 (FIG. 2) into pawl 300 (which is assumed to be initially disposed in the vertical or unlocked direction as indicated in solid lines in FIG. 10) and then pivoted about its axis in the counterclockwise direction, pawl 300 is caused to rotate about boss 304 in the counterclockwise direction into engagement with spring leg 60. Further rotation of key 172 and pawl 300 causes neck 160 to bear against rib 112, thereby causing neck portion 315 to ride outwardly and downwardly over the edge of the rib until portion 315 rides over the rib end. At this point, the longitudinal axis of pawl 300 is perpendicular to the axis of leg 60 with the bottom surface of the pawl resting firmly against the leg. Furthermore, the leg is now angulated slightly with respect to the vertical, and the axis of pawl 300 is slightly above the horizontal. Pawl 300 is thus locked firmly in place as shown at 300' of FIG. 10, thereby positively retaining brake spring 54, and thus retaining the entire starter mechanism 138, from vertical translation into engagement with ring gear 28. This key-locking feature is particularly useful where engine 22 is mounted to a lawnmower or tiller, or the like. In these types of situations, the engine is in storage for a good part of the year and may be subjected to tampering, as by small children for example. With the starter lock activated as shown in FIG. 10, engagement of the starter mechanism and cranking of the engine is prevented regardless of how hard or how often the starter rope is pulled. To unlock the starter mechanism, key 172 is inserted through aperture 122 and slot 120 of keyhole 118, and into pawl 300. The key and pawl are then rotated clockwise thereby allowing the spring action of brake spring 54, which was placed under stress by the downward movement of neck 160 during the above-described locking action, to move spring leg 60 out of engagement with rib 112.

The purpose of clip 142 where engine 22 includes a double-geared flywheel 26 of the type illustrated in FIG. 1 will be best understood with respect to FIG. 11. As illustrated in FIG. 11, clip 142 prevents starter rope 40 from assuming a straight vertical configuration when the rope is completely played out, and thus prevents the rope from becoming pinched between the periphery of pulley 32 and ring gear 29. As indicated in FIG. 11, a second hole 190 is preferably provided in pulley groove root 39 diametrically opposite hole 44. Should rope 40 be cut or broken during field use, a replacement rope may be affixed to the pulley by playing the same through hole 190 into the open cavity 192 defined by pulley spokes 191, 193, and then tying a knot in the rope end, cavity 192 being openly accessible as shown in FIG. 2. Rope 40 may thus be replaced in the field without the use of specialized staple-driving equipment required for insertion of staple 46.

Recently proposed safety standards for garden and recreational vehicles require that the engines thereof be incapable of starting when the drive train or vehicle transmission is in any position other than neutral. To accomplish this purpose, and referring to FIGS. 1-3 and 5-6, a Bowden cable 200 having a flexible outer sheath 202 and an inner cable or wire 204 is mounted to starter 20, wire 204 being operatively connected to the drive transmission associated with engine 22, as to the transmission control lever of a garden tractor for example. Cable 200 is placed across the front of mounting bracket 94 with sheath 202 fitting underneath a horizontal rib 206 on the outside face 208 of bracket wall 98. The end 210 of sheath 202 is placed in a channel defined by rib 206 and a second rib 214 disposed vertically below rib 206. When the drive transmission is in any position other than neutral, wire 204 extends from end 210 of sheath 202 into the space between ribs 206, 214 across slot 108. In this condition, which is shown in FIG. 3, wire 204 blocks slot 108 and captures shaft 34 in the bottom of the slot such that pulling action on rope 40 causes only rotation of pulley 32 about its shaft, vertical translation movement of the pulley and integral starter gear 30 being prevented by wire 204. When the transmission is placed in neutral, wire 204 is retracted into sheath 202 such that starter mechanism 138 is free to translate vertically as discussed in detail above.

Cable 200 is retained on bracket 94 by a spring clip 220. Clip 220 is formed of flat spring steel and comprises a pair of open spring loops 222, 224 having a common inner spring leg 226 which attaches the loops to each other. Spring loop 222 has an L-shaped outer spring leg 228 while loop 224 has a similarly shaped outer spring leg 230, the respective feet on legs 228, 230 extending away from each other. Legs 228, 230 are received in a pair of parallel slots 232, 234 in wall 98 of bracket 94. When installing spring clip 220, spring loop 222 is placed over sheath 202 and L-shaped spring leg 228 is fed through slot 232 until the foot of the spring leg engages the inner surface of wall 98. Force is then applied to spring loop 224 to force leg 230 into slot 234 until the foot of leg 230 engages wall 98 as shown in FIG. 5. Spring clip 220 is thus mounted to bracket wall 98 and held firmly in place thereon by the essentially unyielding interference between corresponding surfaces of bracket wall 98 and spring legs 228, 230. Compression of the spring from its free condition to its slotted or assembled condition causes a decrease in the radius of curvature of loop 222 (and loop 224) such that, upon final engagement as shown in FIG. 5, sheath 202 and, therefore, cable 200 are held firmly against bracket wall 98.

The integrally molded structure of pulley 32 and starter gear 30 as thus far discussed is presently preferred. An alternative embodiment is shown in FIG. 14 wherein the pulley and gear are formed of separate pieces and, when taken together, comprise an overrun clutch which allows the starter gear to free run (in one direction) independently of the pulley. Referring to FIG. 14, an annular starter gear 240 of molded plastic such as nylon has a plurality of resilient pawls 242 extending tangentially from the radially inner surface thereof 244. Pawls 242 may be formed of carbon steel and molded or inserted into gear 240, or may be of integrally molded nylon. A pulley 246 has a central hub 247 which includes a number of peripherally disposed notches 248 and associated ramps 249. Pulley notches 248 bear against the tips of pawls 242 when the starter is exerting a positive force against flywheel ring gear 28 (FIG. 1). However, if the engine begins to run and starter gear 240 remains engaged with the flywheel due to the operator keeping tension upon pull-cord 40, the flywheel will cause pawls 242 to rotate away from the corresponding notches 248 and ratchet freely over the ramps 249, thereby isolating gear 240 from pulley 246 and protecting the starter assembly from damage.

In the presently preferred embodiment of the invention, starter rope 40 is made fairly long, as on the order of sixty-five inches, so that it is unlikely that the rope will be fully played out under normal conditions. Furthermore, the above-described cooperation between clip 142 and starter mechanism 138 warns the operator to release the rope when the rope is fully played out. Therefore, an overrun clutch, per se is not included in the presently preferred side-mounted starter 20.

It should also be noted that in the presently preferred embodiment of starter 20, pulley groove 38 is slightly wider than the diameter of rope 40 so that the rope is wound in the pulley groove in a single row overlie pattern. To accommodate a sixty-five inch pull-rope, a groove depth equal to seven rope diameters, i.e., seven rope coils, is required. It has been found that the use of the single row overlie pattern in coiling rope 40 avoids recoil and binding problems associated with multiple row recoil patterns; however, where a longer pull-rope is required, a multiple row overlie pattern may be required.

A presently preferred embodiment of the handle 154 provided in accordance with the present invention is shown in FIGS. 15 and 16. As seen therein, handle 154 is generally T-shaped having a hollow stem 250 encompassing end 156 of rope 40. A pair of slots 251 are respectively provided in stem 250, into one of which staple 158 is driven through rope end 156 to reenter stem 250 in the opposing slot. Slots 251 serve the dual purpose of protecting the operator's hand from the staple points and providing a convenient means for locating and retaining the handle in a stapling fixture, thereby insuring alignment of the staple with the center of the rope.

The head 252 of T-shaped handle 154 has a pair of oppositely projecting wings 254, 256, each of which have a gripping surface 258 proximate to stem 250 which is substantially V-shaped in cross section axially of head 252. Preferably, head 252 is substantially ∇-shaped in axial cross section as shown in FIGS. 15 and 16. The cross section of head 252 essentially defines a box-girder profile with sufficient section modulus to provide inherent beam strength. Thus, handle 154 may be fabricated of a low cost plastic resin having a relatively low inherent tensile strength and elastic modulus without sacrificing the strength of the overall handle. Indicia such as "PULL TO START" may be printed on the upper or non-gripping surface 260 of the head. As shown in FIG. 16, the V-shaped gripping surface 258 nestles into the closed or partially closed configuration of the operator's hand and presents substantially planar contact surfaces along the first and second phalanges, thereby providing a more comfortable distribution of the pulling force among the fingers. Furthermore, handle 154 facilitates alignment of the operator's forearm and wrist, thereby helping to prevent muscle strain that is possible if rope 40 is pulled with the wrist cocked.

Although gripping surfaces 258 may define a relatively wide range of included angles therebetween and still yield a uniform and comfortable distribution of the pulling force among the fingers, an included angle of about 90° between the gripping surfaces is presently preferred. This angle is felt to correspond to the angle between the first and second phalanges of the average human hand when handle 154 is gripped with the wrist and forearm aligned with the pull-rope as depicted in FIG. 16. Should rope 40 break during use, the handle may be detached from rope 40 by removing staple 158, and then attaching a new starter rope by passing the new rope end through the hole in stem 250 and then through one end of hollow head 252, tying a knot in the rope end, and then pulling the rope back into the handle such that the knot is captured within the head.

An alternative embodiment of the handle provided by the present invention is shown at 262 of FIG. 17. In this embodiment an open head 264 which is substantially V-shaped in axial cross section replaces the hollow head 252 of the embodiment of FIG. 15, stem 265 being identical to stem 250. Gripping surfaces 266 join stem 265 in the embodiment of FIG. 17 to form an open topped handle having the same comfort characteristics as does handle 154 of FIG. 15.

It will be evident from the foregoing description of the starter provided by the present invention that the principles thereof are readily adaptable to starter types other than the presently preferred side-mounted embodiment 20 depicted in FIGS. 1–16. For example, a starter 340 is depicted in FIGS. 18–21 which is adapted to be top-mounted to a vertical crankshaft internal combustion engine and which embodies many of the inventive features discussed hereinbefore in connection with the side-mounted starter embodiment. Referring to FIG. 17 an engine cowling 342 is depicted which is similar to that shown at 24 of FIG. 1 and which carries by means of the screws 344 starter 340, the starter being assembled as an integral unit and mounted on the engine cowling in a manner to be described in detail hereinafter. It will be understood that cowling 342 depicted in FIG. 18 is, by way of example, mounted to a vertical crankshaft internal combustion engine of the type shown in FIG. 1, preferably before starter 340 is attached thereto.

Referring now to FIGS. 19–21, starter 340 includes a starter gear 346 which is integrally molded with a rope pulley or sheave 348, the combined pulley and gear having a hollow shaft extending axially therefrom at 350, 352. It will be noted that the diameter of starter gear 346 is considerably less than the diameter of pulley 348, in contrast to the diametric relationship between pulley 32 and gear 30 of FIG. 2. A rope-receiving groove 354 in the periphery of pulley 348 receives a sixty-five inch nylon-braided starter rope 356 at the pulley-remote end of which is stapled an operator handle 358. Handle 358 is also shown in FIG. 22 and will be discussed in detail in connection therewith. A hub 360 extends axially upwardly of pulley 348 and has a peripheral groove 362 to receive a brake spring 364. Brake spring 364 is formed as a spring loop and has a radially extending leg 365, and a leg 367 generally parallel to leg 365 but having a knee portion 369 cocked at its loop-remote end toward and then again parallel to leg 365.

A spirally wound recoil spring 366 is received in a spring housing 368, the outer end of spring 366 having a hole 370 which is fitted over a corresponding dog 372 in the peripheral rim 374 of housing 368. A hooked grounding finger 376 extends radially outwardly of housing rim 374. Housing 368 is received by means of a central hole 378 in the base thereof over the support ribs 380 extending along shaft 350 from hub 360, one of the ribs 380 being hook-shaped to receive the inner end 382 of recoil spring 366 in a manner similar to that depicted and discussed earlier in connection with FIG. 13. Thus, as was the case with the side-mount starter 20 discussed hereinbefore, recoil spring 366 of top-mounted starter 340 surrounds the axis of pulley shaft 350, is attached to pulley 348 at inner spring end 382 and is adapted to be attached to spring ground at the outer spring end via finger 376.

The mechanism thus far described, which comprises the moving portion of starter 340, may be assembled as follows. Rope 356 is first attached to pulley 348 by a staple (not shown) as discussed hereinbefore in connection with staple 46 and rope 40 (FIG. 2), and then coiled in a single overlie pattern into pulley groove 354. Brake spring 364 is then snapped into hub groove 362. Recoil spring 366 is then placed within housing 368 with hole 370 engaged with dog 372 as above-described, and the housing is fitted over ribs 380 with spring end 382 attached to the corresponding rib.

The starter mechanism is then received in a molded plastic starter housing 384 which is formed generally in the shape of an inverted cup, and which, in the assembly process, is held in an inverted position relative to its assembled orientation shown in the drawings. An axial rib 386, against which the hooked end of finger 376 abuts, is formed on the inside wall of housing 384 as best seen in FIG. 20. As was discussed above in connection with starter 20, spring 366 is preferably prewound several turns before finger 376 is placed into abutment with rib 386, and pull-rope 356 being suitably temporarily retained in tension. A pair of cylindrical ribs 388, 390 best seen in FIG. 20 extend downwardly from the base of housing 384 and cooperate with legs 365, 367 of spring 364 to achieve brake relief when starter 340 moves into cranking engagement with the engine crankshaft. When the starter mechanism is assembled into housing 384, spring leg 365 is located between ribs 388, 390 and cocked leg 367 is located adjacent rib 390 on the side thereof remote from rib 388. The base of cup-shaped housing 384, which comprises the top of starter 340 in final assembly, has a centrally located elongated hollow boss 392 into which pulley shaft 350 is slidably received, boss 392 thus forming one of the slots which journals shaft 350 for linear motion of the starter mechanism. At this point in the preferred assembly procedure, rope 356 may be fed through a grommet 394 in the wall of housing 384 and attached to handle 358.

With the starter mechanism thus placed in housing 384, a bearing plate 396 is attached to the bottom of housing 384 by means of studs 398 received in corresponding threaded bosses 400 in the outer bracket wall. Plate 396 has a generally elliptical opening 402 formed centrally therein, the rim of opening 402 being surrounded by a raised boss or bearing surface 404 upon which the starter mechanism, or, more particularly, the lower face of pulley 348 rides during operation of the starter, starter gear 346 extending through opening 402. A hollow boss or cup-like projection 406 extends downwardly from opening 402. The side wall of boss 406 only partially surrounds starter gear 346, a portion of the boss side wall being open to allow the starter gear to move bodily or translate radially into operative cranking engagement with the engine crankshaft. The bottom surface of boss 406 has formed centrally therein a slot 408 which is parallel to boss 392 in housing 384 and into which pulley shaft 352 is slidably received, slot 408 thus forming a second slot to journal shaft 352 for the bodily linear engaging-disengaging motion of the starter mechanism.

As best seen in FIGS. 19 and 21, a gear cup 410 is affixed by means of a nut 412 to the threaded end of the engine crankshaft 414. Cup 410 has a ring gear 409 internally formed on the open rim thereof, gear 409 being adapted for cooperative engagement with starter gear 346 to crank the engine. FIG. 21 depicts the starter mechanism in the engaged position with starter gear 346 in meshed engagement with ring gear 409, and with the axis of the starter mechanism displaced to the right, as seen in FIG. 21, from its rest position coaxial with crankshaft 414. A guard screen 411 is welded to the outside rim of cup 410. Crankshaft 414 also carries a cast iron flywheel 416 and a molded plastic impeller 418 which is received by snap-fit tongue-in-groove engagement to flywheel 416 and which is held centrally against the flywheel by the base of starter cup 410. The structure of and relationship between cup 410, flywheel 416 and impeller 418 are the subject of a separate U.S. patent application of William O. Hermanson, Ser. No. 545,484 filed Jan. 30, 1975, and are discussed in detail therein, that application being assigned to the assignee hereof. To complete the preferred assembly method, the assembled starter 340 is attached to engine cowling 342 by studs 344 which are threadably received in nuts 422 affixed to the cowling.

Operation of top-mount starter 340 will be evident from the foregoing description of the structure thereof and from the detailed description of the structure and operation of side-mount starter 20 hereinbefore. A starter operator firmly grasps handle 358 and pulls the same radially of grommet 394. However, it will be noted that the direction of pulling of handle 358 is not critical since grommet 394 will act on the starter rope as a corner pulley, transferring to the starter mechanism a force generally in the direction of the grommet regardless of the direction in which the handle is pulled. The component of the pulling force which is in the direction of slots 392,408, which as will be apparent from FIG. 20 is the major force component transferred by rope 356 to the starter mechanism, will cause the mechanism to bodily translate on bearing surface 404, with shafts 350,352 sliding in the journal slots 392,408, into engagement with gear cup 410. The starter gear, pulley and brake spring are partially depicted in FIG. 20 in the engaged position at phantom lines 346',348' and 364', which positions may be compared with the rest positions of those components indicated by the base reference numerals thereof in the same figure.

The pulling force on handle 358 tends to cause clockwise rotation of the starter mechanism, as viewed in FIG. 20, thereby causing spring leg 365 to abut rib 388. This abutment, coupled with the clockwise torque exerted by the hub on the brake spring loop, tightens the brake spring 364 about hub 360 (FIG. 19) such that the initial pulling force on the handle and rope causes the above-described translation. As the starter mechanism approaches the engaged or meshed position, the knee portion 369 of spring leg 367 abuts and slides over rib 390 thus tending to open the brake spring loop and relieve the braking effort on the pulley in the meshed condition of the gears such that the full pulling force may be substantially transferred to corotation of meshed gears 346,410 and to cranking of the engine. When the rope is released, counterclockwise rewinding rotation of the pulley swings spring leg 365 into abutment with rib 390, thereby relieving brake pressure during rope-recoil. It will thus be appreciated that the structural cooperation between spring legs 365,367 and ribs 388,390, and particularly between leg 367 and rib 390 upon engagement of the starter gears, is analagous to the cooperation between spring legs 58,60 and ribs 112,114 described in greater detail above in connection with FIGS. 8 and 9. As was the case with the side-mounted embodiment, recoil spring 366 acts both to recoil rope 356 onto pulley 348 and to pull the starter out of engagement with gear cup 410.

In addition to the evident economic advantages of starter 340 provided by the reduced number and the low fabrication cost of the individual piece parts, and by the economical method of assemblying the starter described above, the top-mounted starter provided by the present invention is characterized by another significant advantage. As indicated above, side-mounted starters of the prior art have generally been characterized by a gear reduction system which results in easier engine cranking. By contrast, top-mounted starters of the prior art have generally embodied various types of clutch arrangements providing effectively a 1:1 starter-engine cranking ratio, thus making engine cranking, particularly in the case of medium horsepower engines, relatively difficult. The top-mounted starter provided by the present invention, on the other hand, has the same gear reduction ratio as does the side-mounted embodiment provided hereby: in the embodiments depicted about 1.66:1. Starter 340 which, as presently contemplated, is particularly suitable for use with medium horsepower engines and will thus achieve engine cranking with reduced operator effort.

It will also be apparent that, although the top-mounted starter 340 depicted and described herein does not include all of the features disclosed in connection with side-mounted starter 20, such as the transmission/-starter interlock and the key-locking feature, starter 340 may be readily adapted to such features. For example, boss 392 may be provided with aligned cable wire holes and housing 384 may be provided with suitable spring-clip slots such that Bowden interlock cable 200 and spring-clip 220 (FIGS. 2–3 and 5–6) may be mounted thereon to capture shaft 350 in boss 392 and prevent starting of the engine when the transmission is engaged. It will also be understood and evident from the drawings, particularly from FIG. 21, that top-mounted starter 340, which is disclosed in connection with a vertical crankshaft engine, may be readily adapted for use as a side-mount starter on a horizontal crankshaft engine, i.e., where the axis of crankshaft 414 is horizontal rather than vertical.

Handle 358 of top-mounted starter 340 is yet another embodiment of the handle provided by the present invention and is depicted in enlarged detail in FIG. 22. Referring to FIG. 22, handle 358 is generally T-shaped having a hollow stem 424 into which starter rope 356 extends and to which the rope is affixed by a staple 426. The head 428 of handle 358 forms a hollow box-girder having a generally pentagonal cross section with gripping surfaces 430, which characterize the handle provided by the invention, forming a V-shaped cross section contiguous with stem 424. The sides 432 of head 428 which are contiguous with the respective gripping surfaces 430 have a series of serrations or steps formed on the outer surface thereof in the axial direction.

From the foregoing description of the presently preferred embodiments of the invention, it will be understood that the manner in which the outer end of the recoil spring is grounded to the stationary bracket or other fixed support may be varied from the sliding fulcrum disclosed. For example, referring to the side-mounted embodiment of FIGS. 1–13, in lieu of attaching the outer end of recoil spring 80 to bracket 94 via housing wall 74, finger 76 and shoulder 130 (FIGS. 2 and 7), a suitable link may be pivotally attached to the wall of the spring housing and disposed downwardly (as viewed in FIG. 7) to a suitable fixed anchoring point affixed to inner wall 96 of bracket 94, thus stationarily locating the grounding point generally between the shaft axis of pulley 30 and the side wall 102 of the bracket. Other variations of this feature as well as the other features embodied in the present invention will also be apparent to those skilled in the art in view of the foregoing disclosure. Accordingly, the invention is intended to embrace all such alternatives, modifications and variations as fall within the spirit and broad scope of the appended claims.

The invention claimed is:

1. The combination comprising an internal combustion engine, a propulsion system coupled to said engine including a transmission having at least neutral and drive positions, and a pull-rope recoil starter for starting said engine including a pull-rope and support means fixedly attached to said engine having slot means extending generally in the direction of normal pulling force exerted by an operator on said pull-rope, engine cranking means operatively coupled to said pull-rope and responsive to pulling of said rope to translate in said slot means into starting engagement with said engine, and means operatively coupled to said transmission to block translation in said slot means of said cranking means into starting engagement with said engine when said transmission is in other than said neutral position.

2. The combination set forth in claim 1 wherein said transmission coupled means comprises an outer conduit fixedly attached to said starter and an inner wire axially movable in said conduit and being extended from said conduit when said transmission is in other than said neutral position to capture said cranking means in said slot means.

3. The combination comprising an internal combustion engine having a crankshaft and a gear operatively coupled to said crankshaft for starting said engine, a propulsion system coupled to said engine and including transmission means having at least neutral and drive positions, and a pull-rope recoil starter for starting said engine, said starter comprising support means fixedly attached to said engine and having a pair of spaced slots extending in the direction of said first starter gear, engine cranking means including a second starter gear having shaft means axially extending between said slots and slidably journalled therein for rotation about the axis of said shaft and bodily movement in a direction transverse to said axis, rope winding means operatively coupled to said second gear, a pull-rope extractably wound upon said rope winding means for activation of said starter by an operator, said engine cranking means being responsive to pulling on said rope by an operator to translate said second gear in said slots into engagement with said first gear, continued pulling on said rope causing corotation of said starter gears to crank said engine, and interlock means operatively coupled to said transmission means and to said support means to block bodily movement of said shaft means toward said first gear and thereby prevent translation of said cranking means in said slots when said transmission means is in a position other than said neutral position.

4. The combination set forth in claim 3 wherein said interlock means comprises a Bowden cable having a flexible outer conduit and an inner wire movable in said conduit, said wire extending from said conduit when said transmission is in other than said neutral position, and wherein said support means includes means guiding said wire across one of said slots when said wire is extended from said conduit, said shaft means extending into said one of said slots below said guide means, said extended wire capturing said shaft means within said slot.

5. The combination set forth in claim 4 wherein said support means includes a pair of parallel slots, one of said slots being generally aligned with said guide means, and wherein said starter further comprises a spring clip having a pair of open spring loops with a common inner spring leg connecting said loops and respective outer spring legs extending through said parallel slots and attaching said spring clip to said support means, one of said spring loops being generally aligned with said guide means and encompassing said cable.

* * * * *